Dec. 22, 1931.                P. J. WIEZEVICH ET AL                 1,838,032
                 PROCESS FOR PRODUCING SALTS OF ALIPHATIC ACIDS
                         FROM LOW BOILING HYDROCARBONS
                              Filed Sept. 12, 1929

INVENTORS
PETER J. WIEZEVICH & RICHARD E. TANNICH
BY
*[signature]*
ATTORNEY

Patented Dec. 22, 1931

1,838,032

UNITED STATES PATENT OFFICE

PETER J. WIEZEVICH, OF SCRANTON, PENNSYLVANIA, AND RICHARD E. TANNICH, OF WEIMAR, TEXAS, ASSIGNORS TO STANDARD OIL DEVELOPMENT COMPANY

PROCESS FOR PRODUCING SALTS OF ALIPHATIC ACIDS FROM LOW BOILING HYDROCARBONS

Application filed September 12, 1929. Serial No. 392,156.

The present invention relates to an improved process for manufacture of salts of aliphatic acids from low boiling aliphatic hydrocarbons and more specifically to a process for the production of aliphatic acids and salts thereof from liquid or easily liquefiable hydrocarbons such as propane, butane, pentane, hexane, heptane and the like, or mixtures of such hydrocarbons. The invention will be fully understood from the following description and the drawing which illustrates one form of apparatus suitable for the purpose.

The drawing is a semi-diagrammatic view in sectional elevation of an apparatus constructed according to the invention and indicates the flow of the various products.

Referring to the drawing reference character 1 denotes a feed pump which forces a hydrocarbon in liquid form or a mixture of such hydrocarbons through pipe 2 under high pressure into an absorption tower 3. Air or other gas rich in free oxygen is forced into the lower part of the tower by compressor 4 and in flowing up through the tower contacts with the descending oil. Unabsorbed gas leaves the top of the tower by line 5 and oil containing dissolved oxygen flows by pipe 6 to a heat exchanger 7 and thence by pipe 8 to a reaction vessel 9, which is adapted to withstand high pressure in considerable excess of atmospheric; for example, above 300 pounds per square inch and generally from 2000 to 3000 pounds per square inch, or higher.

A part of the oil from pump 1 may be forced through branch line 10 and heater 11 and thence joining the oil containing dissolved oxygen in line 8 prior to entrance into reactor 9. The reactor may be fitted with temperature regulation coils 12 by which temperature may be maintained within the specified temperature range disclosed below.

The reaction products are discharged from the reactor through line 13, exchanger 7 and a cooler 14 into a separation drum 15 from which condensed water may be removed either continuously or at intervals. The oily products then flow to a neutralizer for neutralization with lime or other alkali indicated generally at 16 after pressure reduction at valve 17.

The neutralizer comprises a pipe 16' fitted with baffling or preferably stirring means, such as a helical conveyor 18. Lime is fed from two bins 19 and 20 which are adapted to withstand a considerable pressure, and are arranged with suitable valves so that one may be filled while the other is connected into the system. Lines 19$^a$ and 20$^a$ are provided for putting the bins under pressure from some external source to prevent backing up of liquid and to allow the lime to feed by gravity. The bins feed lime or other alkali automatically to conveyors 22 and 23 into pipe 16' and it is preferable to supply a stream of a non-aqueous liquid such as a part of the hydrocarbon oil into the conveyor 23 by means of line 23' to form a slurry of lime to carry it into the neutralizer.

The neutralizer discharges into a separation chamber 24 in which the solid lime salts settle and from which the neutralized liquid may be removed by pump 25 and line 26. A part of the neutralized liquid may be used to form the lime slurry and is forced into conveyor 23 by line 23' as indicated above and the remainder is returned by line 27 to the top of tower 3. The recirculated oil may be passed through a scrubber 27$^a$ and washed with alkali metal bisulphite solution, circulated by pump 27$^b$ so as to remove a substantial portion of ketones and aldehydes, if desired.

A sludge of lime salts in the hydrocarbon oil may be emptied from drum 24 into one or the other of two receivers 28 and 29 by proper manipulation of suitable valves and by heating the receivers, the oil may be vaporized and condensed in cooler 30 and discharged into an accumulator 31. The receivers may be heated by suitable steam jackets (not shown) or otherwise and substantially dry salts may be discharged from the receivers. The accumulated liquid may be pumped to coil heater 11 by line 32 and pump 33 or to scrubber 27$^a$ if desired, by a suitable pipe (not shown).

In the operation of the present process low boiling aliphatic hydrocarbons are partially oxidized by continuous passage through a reactor with air or other gas rich in free oxygen under pressure in considerable excess of atmospheric pressure, say about 300 pounds per square inch, but preferably above about 2000 pounds per square inch. The temperature is above about 200° C. and preferably below 600° C. The product is then cooled and the aqueous layer may be separated but this is not requisite as the water may be taken up by the lime. While still under pressure sufficient to keep the hydrocarbon liquid alkali is added preferably in a slurry in a non-aqueous liquid; for example, in oil of the same general character as that being oxidized. While soda or potash may be used, it is preferable to use lime and to continuously add it. If milk of lime is used it is desirable to leave the oily product slightly acid, containing, for example .10% acid and to separate aqueous and oily layers. The oily layer may be recirculated and the aqueous layer evaporated to produce dry salts. If a non-aqueous neutralization medium, such as oil is used it is preferable to neutralize completely and dry salts are immediately produced.

Other oxidation products such as alcohols, aldehydes and ketones are present and it is desirable to prevent the accumulation of ketones and to return the alcohols to the oxidation step along with unoxidized hydrocarbon. Aldehydes may also be returned. Ketones may be removed in any suitable manner, such as by washing with alkali bisulphite solution or otherwise.

As an example of the operation of the present process, pentane is oxidized by passage with air through a reactor maintained at 260° C. and under pressure of 3000 pounds per square inch. The concentration of inlet oxygen is 5.6%. The outgoing material is cooled and lime added in proportion of about 1 lb. per 20 gallons of pentane. The lime salts are separated and the liquid returned to the oxidation step with fresh air. The acid is liberated by action of sulphuric acid or other strong acid on the lime salts and after a week's operation a yield of one gallon of acids for each 5 gallons of pentane is found. The acid has the following composition:

|  | Per cent by volume |
|---|---|
| Formic acid | 20 |
| Acetic acid | 53 |
| Propionic acid | 14 |
| Higher acid | 13 |

Aldehydes, alcohols and ketones are identified in the recirculated pentane.

The present process is not to be limited by any theory of the mechanism of the process nor by any example given merely by way of illustration, but only by the following claims in which it is desired to claim all novelty inherent in the invention.

We claim:

1. Process for producing salts of aliphatic acids comprising continuously passing low boiling aliphatic hydrocarbons and a gas rich in free oxygen through a non-catalytic partial oxidation zone maintained at a pressure between 300 and 3000 pounds per square inch and at a temperature between 200° and 600° C., whereby aliphatic acids are produced from the hydrocarbons, adding alkali to the oily product containing the acids, separating salts produced by reaction of the alkali and acids, and returning the unoxidized and partially oxidized materials to the reaction zone.

2. Process according to claim 1, in which the alkali added is insufficient to completely neutralize the oily product.

3. Process according to claim 1, in which the alkali added is sufficient to leave the oily product with a content of not more than about .1% acid.

4. Process according to claim 1 in which the addition of alkali is carried on under pressure, whereby the residual materials to be returned to the reaction zone may be so returned without substantial recompression.

5. Process according to claim 1 in which the alkali is lime in a non-aqueous suspension.

6. Process according to claim 1 in which ketones and aldehydes are produced along with the acids and are removed for the most part by a wash with an alkali metal bisulphite prior to the return of unreacted materials to the reaction zone.

PETER J. WIEZEVICH.
RICHARD E. TANNICH.